United States Patent [19]

Weninger et al.

[11] 4,019,815
[45] Apr. 26, 1977

[54] FILM HANDLING APPARATUS BLOWER SYSTEM

[75] Inventors: Frank L. Weninger, Chicago; John P. Bagby, Lake Forest; Kenyon A. Hapke, Libertyville; Jack W. Hinshaw, Northbrook; George C. Karalus, Arlington Heights; Eugene F. Koppensteiner, Niles; Roger R. Tomlinson, Wheeling, all of Ill.

[73] Assignee: Polaroid Corporation, Cambridge, Mass.

[22] Filed: Mar. 26, 1975

[21] Appl. No.: 562,112

Related U.S. Application Data

[62] Division of Ser. No. 374,285, June 28, 1973, abandoned.

[52] U.S. Cl. .............................................. 353/61
[51] Int. Cl.² .................................... G03B 21/16
[58] Field of Search .................. 353/60, 61, 57, 58; 416/231; 415/96, 121 G, 214; 352/202, 146, 72, 78, 74

[56] References Cited

UNITED STATES PATENTS

| 1,037,659 | 9/1912 | Rembert | 415/121 G |
| 2,655,310 | 10/1953 | Schlumbohn | 415/90 |
| 3,019,701 | 2/1962 | Brueckner | 353/61 |
| 3,116,662 | 1/1964 | Rosenberger | 353/61 |
| 3,128,940 | 4/1964 | McDonald | 415/214 |
| 3,152,509 | 10/1964 | Zillmer | 352/202 |
| 3,181,415 | 5/1965 | Laing | 353/58 |
| 3,702,721 | 11/1972 | Skuja | 353/19 |
| 3,792,919 | 2/1974 | Holmes et al. | 352/202 |

Primary Examiner—Harry N. Haroian
Attorney, Agent, or Firm—David R. Thornton

[57] ABSTRACT

A film handling apparatus blower system. The system includes a blower having a high-pressure, low-volume section and low-pressure, high-volume section. The high-pressure, low-volume section is a scroll-type centrifugal blower with a circular impeller of cellular material to minimize discernible noise, an axial intake port, and a high-pressure outlet port. The high-pressure outlet port is coupled to a duct which directs the output high-pressure air flow into a film cassette. The low-pressure, high volume section is also a scroll-type centrifugal blower having a bladed fan wheel, an axial intake port, and three low-pressure outlet ports. One low-pressure outlet port is coupled to a duct which directs output air flow to a location for flow adjacent the rearward portion of a projection lamp. A second low-pressure outlet port is coupled to a duct which directs output air flow to a location for flow adjacent the frontal portion of the projection lamp. A third low-pressure outlet port is coupled to a duct which directs output air flow across the AC drive motor of the film handling apparatus.

2 Claims, 8 Drawing Figures

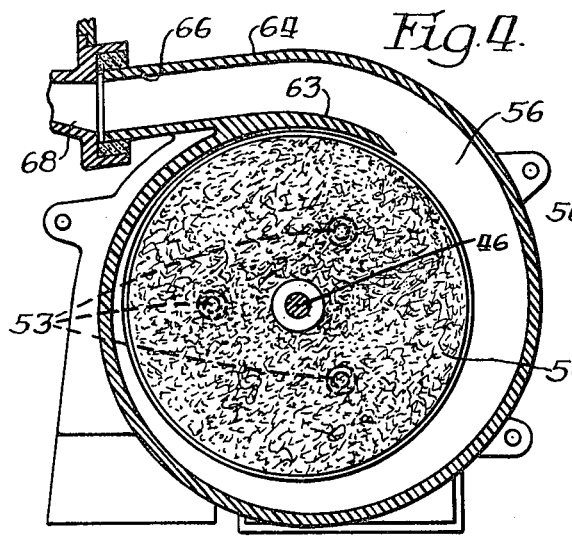
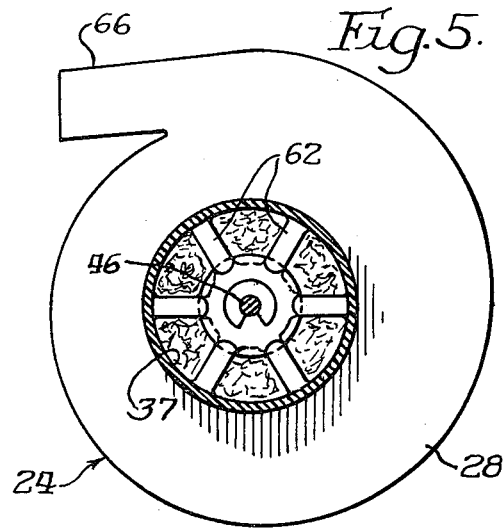
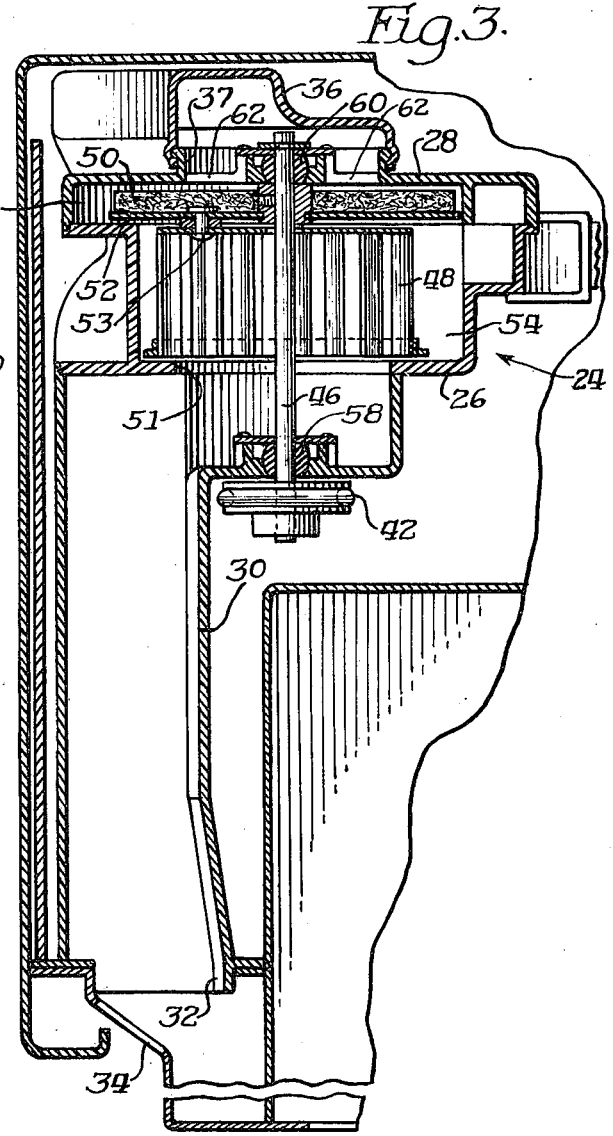
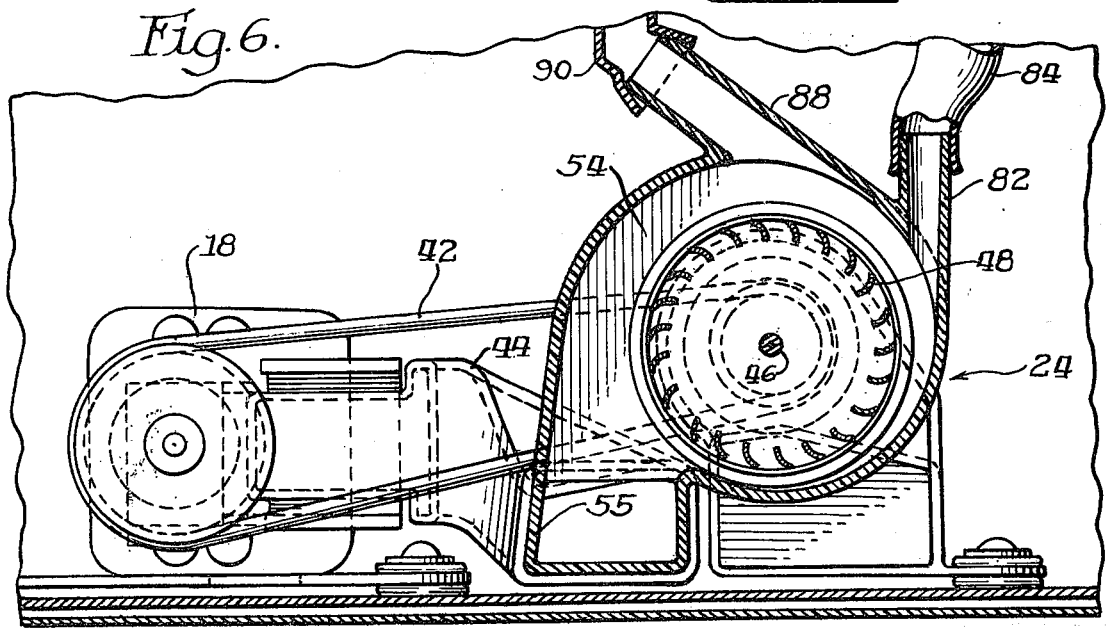

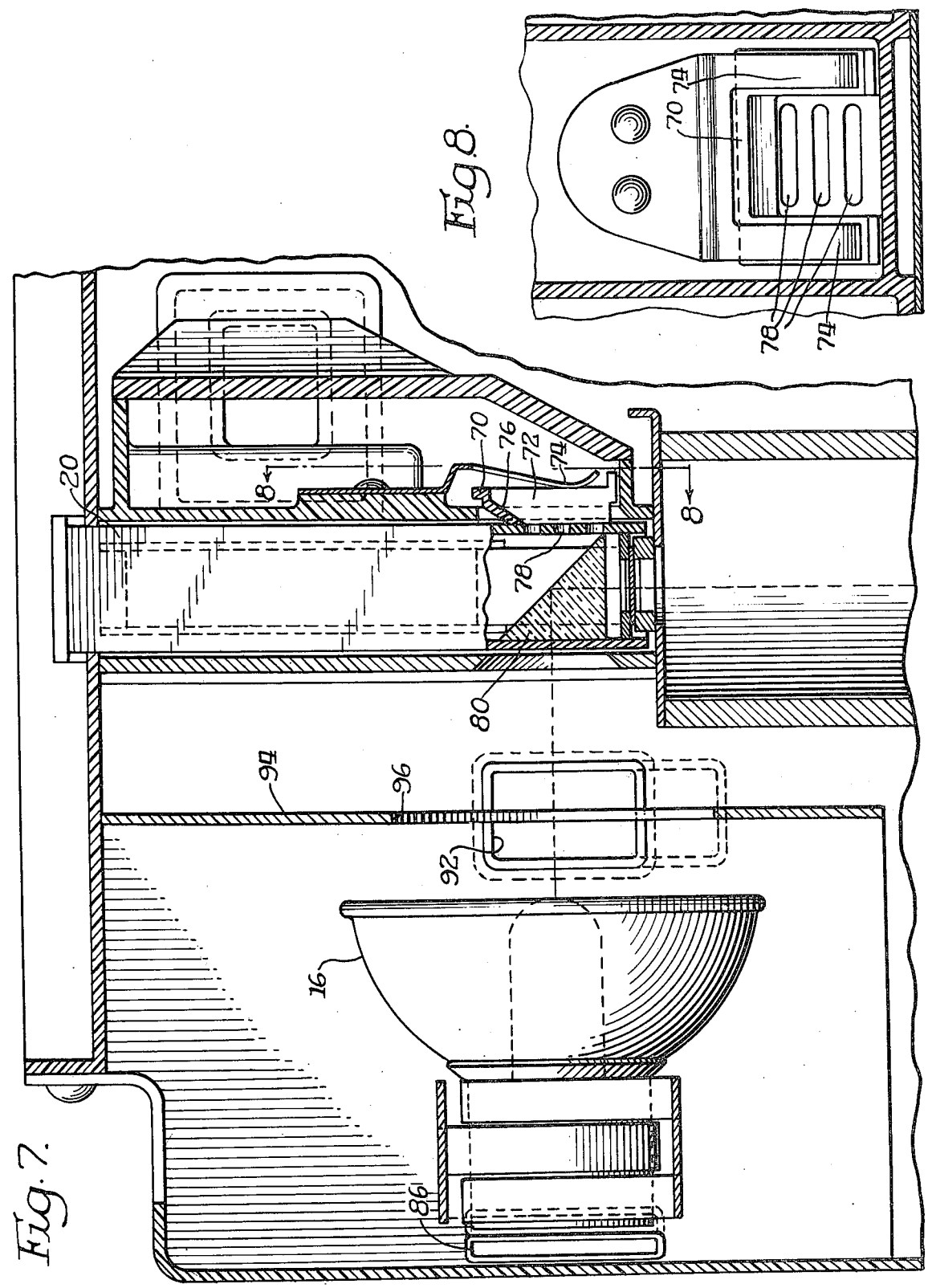

FILM HANDLING APPARATUS BLOWER SYSTEM

This is a division of copending application Ser. No. 374,285 filed on June 28, 1973 by the same inventors as herein, now abandoned.

This invention relates to a film handling apparatus, and, in particular, to a blower system for film handling apparatus.

Recent technological advances have made possible a rapid-process cassette system of motion picture photography which permits the photographer himself to expose, process, and project a length of motion picture film, all without removing the film from the cassette. Rapid-process film cassetts of type referred to are described, for example, in U.S. Pat. No. 3,608,455.

In the rapid-process cassette system, the film cassette is internally provided with processing means comprising a supply of development fluid contained in a rupturable container or pod and an applicator for applying the development fluid to the film emulsion. During exposure in a camera adapted to receive the cassette, the film is advanced from the cassette supply reel to the cassette take-up reel. To process the exposed film, the cassette is removed from the camera and inserted into a processor/projector unit. The development fluid pod in the cassette is ruptured, and a drive system is actuated to transport the exposed film from the take-up reel back to the supply reel. As the film is transported to the supply reel, the applicator within the cassette deposits a coating of the development fluid on the film emulsion surface to effect rapid processing of the film. The film may then be projected by actuating a projection drive shuttle to advance the film from the supply reel to the take-up reel. Following projection, the film may be rewound onto the supply reel and conveniently stored in the cassette in readiness for subsequent viewing.

The processor/projector unit in a rapid-process cassette system of the type referred to functions, as indicated, to both develop the film and project the film. As described in the application of Erwin E. Figge et al, entitled Film Handling Apparatus Control System, filed concurrently herewith and assigned to the same assignee, the processor/projector unit is preferably programmed to proceed with a mandatory "project" mode following the "develop" mode. During this mandatory project mode, the processed film is dried, as it is projected, by the radiant heat of the projection lamp and also by a high-pressure flow of air into the cassette provided by the blower system of the present invention. Simultaneously, the blower system of the present invention provides a low-pressure, high-volume flow of air to cool the rearward portion of the projection lamp, the AC drive motor, and the cassette well wall region.

In addition to aiding drying of newly developed film subequent to the "develop" mode of the processor/projector unit, the high-pressure flow of air into the cassette provided by the blower system of the present invention during the normal projection mode is effective during subsequent repeated use of the cassette to cool the portion of the film in the film gate area and to cool the projection-beam-directing prism which is internally provided in the cassette.

A further feature of the blower system of the present invention is the minimization of discernible blower noise. The high-pressure section of the blower is a scroll-type centrifugal blower with a circular impeller of open-pore cellular material. This construction has not only been found capable of providing the requisite high-pressure output characteristic required, but it also has been found to have a broad spectrum noise characteristic which is less discernible and noticeable than the noise "tones" produced by a conventional impeller structure of regular geometric configuration. To enhance the high-pressure characteristic of the air flow developed by the cellular impeller, the blower chamber maintains volute integrity through a geometric angular excursion of more than one revolution before forming a tangentially departing outlet port.

In brief, the present invention provides a film handling apparatus blower system including a blower having a high-pressure, low-volume section and a low-pressure, high-volume section in a scroll-type centrifugal blower, with a high pressure circular impeller of cellular material to minimize discernible noise, an axial intake port, and a high-pressure outlet port. The high-pressure outlet port is preferably coupled to a duct which directs the output high-pressure air flow to a location for flow into a film cassette. The low-pressure, high-volume section is also a scroll-type centrifugal blower having a bladed fan-wheel, an axial intake port, and preferably three low-pressure outlet ports. One low-pressure outlet port is preferably coupled to a duct which directs output air flow to a location for flow adjacent the rearward portion of a projection lamp. A second low-pressure outlet port is preferably coupled to a duct which directs outlet air flow to a location for flow adjacent the frontal portion of the projection lamp and the cassette well wall. A third low-pressure outlet port is preferably coupled to a duct which directs output air flow to the AC drive motor of the film handling apparatus.

These and other features and objects of the present invention will be better understood by reference to the following detailed description taken in conjunction with the accompanying drawings.

IN THE DRAWINGS:

FIG. 3 is a partial view in cross section taken at 3—3 of FIG. 2.

FIG. 4 is a cross-sectional view of the blower high-pressure section taken at 4—4 of FIG. 1.

FIG. 5 is a view of the exterior of the blower high-pressure section taken at 5—5 of FIG. 1.

FIG. 6 is a partial view in cross section taken at 6—6 of FIG. 1.

FIG. 7 is an enlarged view in cross section taken at 7—7 of FIG. 2.

FIG. 8 is view taken at 8—8 of FIG. 7.

Figure 1:
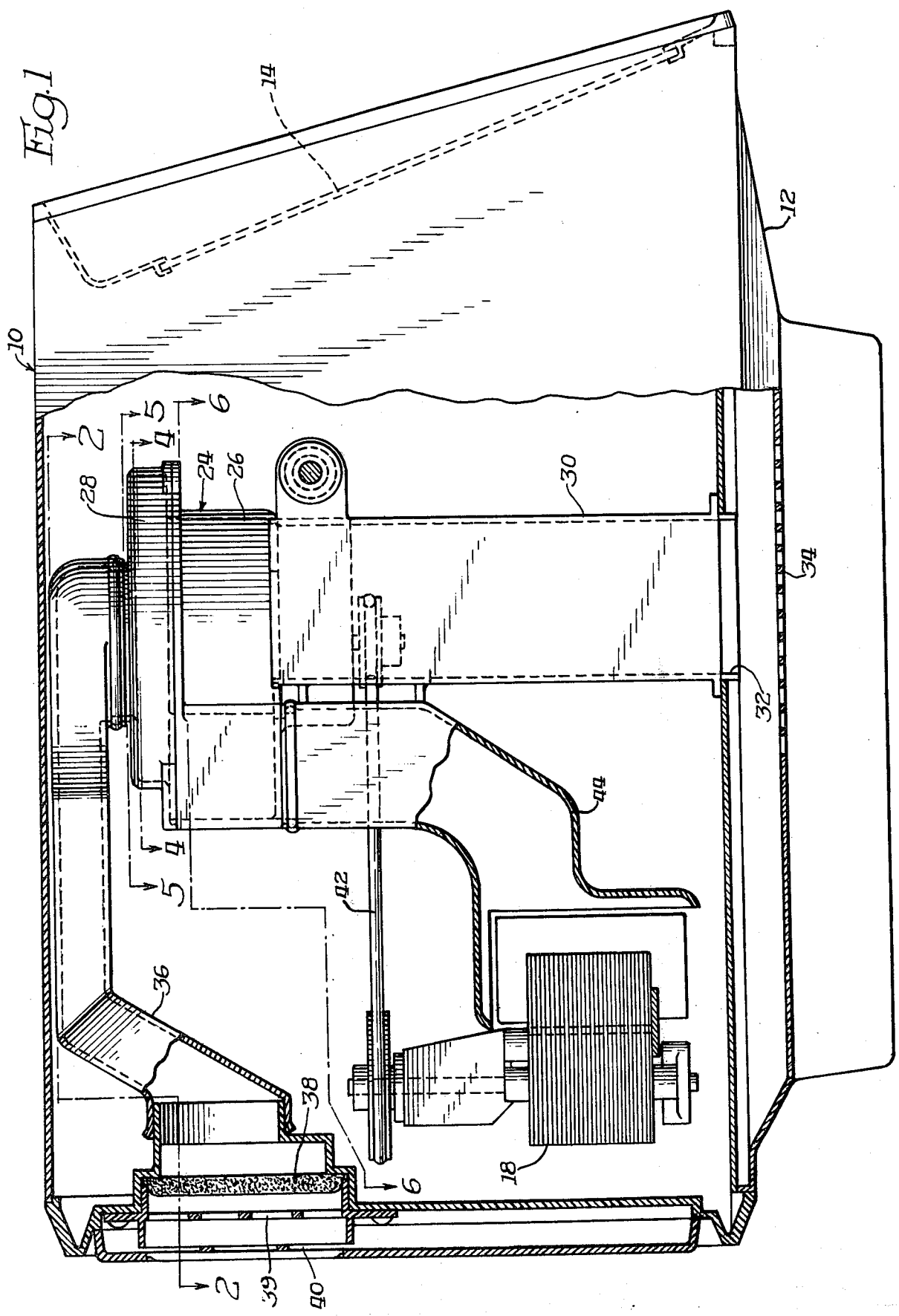
FIG. 1 is a side view partly broken away of processor/projector unit incorporating a blower system in accordance with the present invention.
Figure 2:
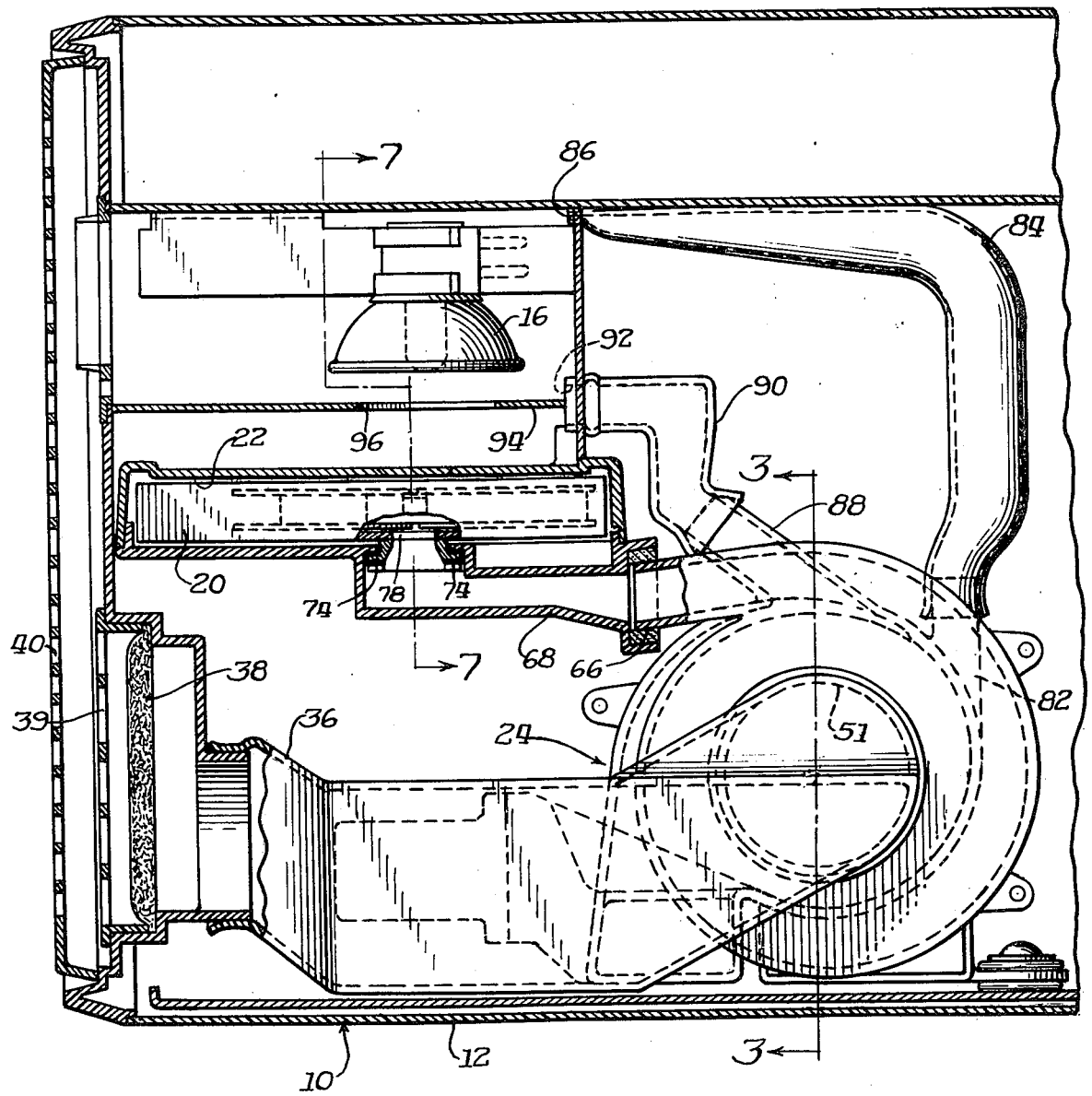
FIG. 2 is a partial view in cross section taken at 2—2 of FIG. 1.

Referring now in particular to FIGS. 1 and 2, there is shown by way of example a processor/projector unit 10 of the type previously referred to incorporating a blower system in accordance with the present invention. The processor/projector unit 10 includes a housing 12, a projection screen 14, a projection lamp 16, and an AC drive motor 18. A cassette 20 is shown in place in a receiving well 22 provided in the housing 12.

In FIG. 1, the blower system is depicted in elevation. The system includes a blower 24 having a high-pressure, low-volume section 28 and a low-pressure, high-volume section 26. Referring additionally to FIGS. 3 through 5, it is seen that the high-pressure, low-volume section 28 is a scroll-type centrifugal blower having a circular impeller 50 of cellular material, an axial intake port 37, and a high-pressure outlet 66. The low-pressure, high-volume section 26 is also a scroll-type centrifugal blower but provided with a cylindrically-bladed fan wheel 48, shown in cross section in FIG. 6. As depicted in FIGS. 3 and 6, the low-pressure, high-volume section 26 is provided with an axial intake port 51 and three low-pressure outlet ports 82, 88, and 55.

Referring to FIG. 3, the high-pressure cellular impeller 50 is affixed by adhesive or otherwise suitably secured to a circular disk 52 which, in turn, is affixed by fasteners 53 to the bladed fan-wheel impeller 48. The bladed impeller 48, in turn, is suitably affixed to the impeller shaft 46 so that both the cellular impeller 50 and the bladed impeller 48 are rotated by the shaft 46. The circular disk 52 functions to effectively separate the volute blower chamber 54 of the low-pressure section 26 from the volute blower chamber 56 of the high-pressure section 28. At the end, the shaft 46 is journaled in a bearing 60 which is supported by a spider structure 62 located in the intake port 37 of the high-pressure section 28. At its opposite end, the shaft 46 is rotatably journaled in a bearing 58 supported by the housing of the low-pressure section 26. As best depicted in FIGS. 1 and 6, the impeller shaft 46 is rotatably driven by the motor 18 through a drive belt 42.

As shown in FIG. 3, the axial intake port 37 of the high-pressure section 28 of the blower is coupled to an intake duct 36 which, as illustrated in FIGS. 1 and 2, is provided at its opposite end with an intake air filter 38. Ambient air is drawn through slotted elements 39 and 40 and passed through the filter 38 enroute to the high-pressure section intake port 37. The single outlet port 66 of the high-pressure blower section 28 is coupled to a duct 68 which, as best illustrated in FIGS. 2 and 7, directs the high-pressure, low-volume output air flow through a port 72 into the interior of the cassette 20 through an arrangement of slots 78 provided in the wall of the cassette 20. As shown in FIGS. 7 and 8, the port 72 for directing high-pressure air flow into the cassette 20 is formed in a laterally-movable air-directing element 70 which is caused to bear against the cassette by a bifurcated leaf spring 74. When the cassette-receiving slot provided in the housing 12 is empty, the element 70 is urged by the spring 74 to a limit position in which the element protrudes appreciably into the cassette-receiving slot. As a cassette is inserted into the receiving slot, the lower edge of the cassette engages a sloped camming surface 76 provided on the element 70, causing the air-directing element 70 to be displaced a distance laterally against the force of the spring 74 to permit complete insertion of the cassette. Upon completed insertion of the cassette, the air-directing element 70 bears against the cassette, directing the high-pressure air flow through the slotted opening 78 into the interior of the cassette.

As earlier noted, the high-pressure air flow into the interior of the cassette 20 functions during the mandatory project mode which follows the "develop" mode of the processor/projector unit to aid the projection beam in drying the newly processed film. In addition, the high-pressure air flow is effective during film projection to cool the portion of the film in the film gate area and to cool the projection-beam-directing prism 80 which is located within the cassette 20. Since the air intake for the high-pressure section 28 of the blower is filtered, the opportunity for the entry of dust or other small particulate foreign matter to be carried into cassette 20 in the high-pressure air flow is minimized.

The low-pressure blower section 26 develops a high-volume flow of air for cooling the projection lamp 16, the cassette well wall 21 adjacent to the lamp, and the motor 18. As illustrated in FIGS. 2 and 6, the outlet ports 82 and 88 of the low-pressure blower section 26 are coupled to outlet ducts 84 and 90, respectively. The outlet duct 84 expels a flow of cooling air from a relatively narrow rectangular opening 86 into the region in proximity of the base of the projection lamp 16, as further depicted in FIG. 7. The outlet duct 90 expels a flow of cooling air from a rectangular opening 92 of relatively larger cross-sectional area into the region in front of the projection lamp 16 and on both sides of a baffle 94 provided with an aperture 96 for passage of the projection lamp beam. The heat baffle 94 serves to intercept a portion of the radiant heat of the projection lamp 16 which would otherwise be incident on the wall 21 of the cassette well 22. The flow of air between the heat baffle 94 and the cassette well wall 21 also serves to cool the well wall 21 directly. This arrangement, in conjunction with the high-pressure, low-volume flow introduced into the cassette via port 72, has been found to be effective to prevent overheating of the cassette well 22 and the cassette 20.

The third outlet port 55 of the low-pressure, high-volume blower section 26 is coupled to a duct 44 which directs a flow of cooling air over the motor 18 as best shown in FIGS. 1 and 6.

It should be noted at this junction that the terms "high-pressure," "low-pressure," "high-volume," and "low-volume" are relative terms. The particular pressure and volume levels employed may vary with the requirements of the particular embodiment of the invention. In the embodiment disclosed, the output of the high-pressure, low-volume section 28 of the blower is preferably 1.5 cubic feet of air per minute at a pressure equivalent to a one inch head of water. The output of the low-pressure, high-volume section 26 of the blower is preferably 17 cubic feet of air per minute at a pressure equivalent to a one-half inch head of water.

As previously noted, the high-pressure, low-volume section 26 of the blower 24 employs a circular impeller 50 of cellular material rotating in a volute blower chamber 56. In order to develop the requisite high-pressure output characteristic, the wall of the blower chamber 56 is configured to maintain volute integrity from the tip of the projection 63 through a geometric angular excursion of more than one revolution (counterclockwise in FIG. 4) before tangentially-departing at 64 to form the tangential outlet port 66. It is important to note at this juncture that the circular impeller consists of an open-pore-type cellular material such as Scott type "O" urethane industrial foam having a porosity of 20 pores per inch. It has been found that the geometric irregular arrangement and paths of the open pores in the cellular material a broad-spectrum non-concentrated noise frequency output which is less noticeable than the noise output of a conventional impeller structure of regular geometric configuration consisting of one or more discernible noise tones. Hence, the unique structure of the high-pressure blower section 28 achieves the high-pressure output characteristic desired with minimum discernible noise output. Since the processor/projector unit is provided with a self-contained viewing screen 14 and is intended to be operated in relatively close proximity to the viewing audience, minimization of discernible noise output from the high-pressure section of the blower is an important attainment.

It should be understood that while a specific preferred embodiment and application of the invention has been shown and described, this is by way of example, and various changes or modifications may be made to fit the requirements of a particular application of the invention without departing from the scope of the invention.

What is claimed is:

1. In a film-handling apparatus having a projection lamp, a drive motor, and a cassette well adapted to receive a film cassette having an air intake port, a blower system comprising:

a blower having a first blower section for developing a relatively high-pressure, low-volume output and a second blower section for developing a relatively low-pressure, high-volume output, said first blower section including means defining a volute blower chamber having a volute integrity maintained through a geometric angular excursion of more than one revolution, an axial intake port and a tangential outlet port, and a circular impeller of cellular material rotatably driven in said volute chamber, said second blower section including means defining a second volute blower chamber having an axial intake port, a tangential outlet, and a cylindrically bladed fan-wheel rotatably driven in said second volute chamber, and said circular impeller of said first blower section and said circular impeller of said second blower section being secured to a common drive shaft rotatably driven by said drive motor;

means for directing output air flow from said first blower section to said cassette air intake port for flow into the interior of said cassette, said means for directing output air flow to said cassette air intake port including a laterally movable air-directing element resiliently biased into the region in which said cassette is received by said film-handling apparatus, said air-directing element being positioned and configured to include a cam surface arranged such that said element is laterally displaced by said cassette upon insertion of said cassette into said receiving region and caused to bear against the cassette to direct said air flow into said cassette air intake port;

means for directing output air flow from said second blower section into proximity with said projection lamp for cooling said projection lamp;

heat baffle means interposed between said projection lamp and said cassette well for minimizing the quantity of projection lamp radiant heat incident on said cassette well, said heat baffle having an aperture therein for passage of the projection lamp light beam;

means for directing additional output air flow from said second blower section into proximity with said heat baffle means; and means for directing additional output air flow from said second blower section into proximity with said drive motor for cooling said drive motor.

2. In a film handling apparatus having a projection lamp and a cassette well having an air intake port, a blower system comprising:

a blower having an inlet port and at least one outlet port; and means for directing air flow from said outlet port to said cassette air intake port, said directing means including a laterally movable air-directing element resiliently biased into the region in which said cassette is received by said film-handling apparatus, said air-directing element being positioned and configured to include a cam surface arranged such that said element is laterally displaced by said cassette upon insertion of said cassette into said receiving region and caused to bear against said cassette to direct said air flow into said cassette air intake port.

* * * * *